United States Patent [19]
Danek et al.

[11] Patent Number: 5,458,388
[45] Date of Patent: Oct. 17, 1995

[54] REPLACEABLE NOZZLE TIP WITH VACUUM ACTUATED MECHANICAL GRIPPING FINGERS

[75] Inventors: John E. Danek, Vestal; Charles E. Johnson, Whitney Point, both of N.Y.

[73] Assignee: Universal Instruments Incorporated, Binghamton, N.Y.

[21] Appl. No.: 285,288

[22] Filed: Aug. 3, 1994

[51] Int. Cl.$^6$ ................................................. B25J 15/12
[52] U.S. Cl. ................................ 294/100; 294/88
[58] Field of Search ................. 294/2, 88, 99.1, 294/100, 64.1, 115; 29/743

[56] References Cited

U.S. PATENT DOCUMENTS

| | | | |
|---|---|---|---|
| 3,929,367 | 12/1975 | Bjurling et al. | 294/100 X |
| 4,173,365 | 11/1979 | Lieb | 294/99.1 |
| 4,527,327 | 7/1985 | Van Deuren . | |
| 4,537,557 | 8/1985 | Whitney . | |
| 4,671,553 | 6/1987 | Bertini | 294/100 x |
| 4,759,124 | 7/1988 | Snyder et al. | 294/2 X |
| 5,029,925 | 7/1991 | Rietzler | 294/100 |
| 5,105,528 | 4/1992 | Soth et al. . | |
| 5,201,696 | 4/1993 | Kinback et al. . | |
| 5,263,753 | 11/1993 | Brev et al. | 294/99.1 |

FOREIGN PATENT DOCUMENTS

| | | | |
|---|---|---|---|
| 154552 | 9/1985 | European Pat. Off. | 294/2 |
| 1743853 | 6/1992 | U.S.S.R. | 294/100 |

*Primary Examiner*—Dean Kramer
*Attorney, Agent, or Firm*—Banner & Allegretti, Ltd.

[57] ABSTRACT

A replaceable nozzle tip for the vacuum spindle of a pick and place machine is provided with mechanical fingers for gripping a component. Vacuum normally supplied to the spindle for acquiring components by suction is used to actuate a plurality of mechanical fingers to acquire components by gripping that are not suitable for acquisition by suction.

9 Claims, 2 Drawing Sheets

REPLACEABLE NOZZLE TIP WITH VACUUM ACTUATED MECHANICAL GRIPPING FINGERS

CROSS-REFERENCES TO THE PRIOR ART

U.S. Pat. No. 4,537,557 entitled REMOTE CENTER COMPLIANCE GRIPPER SYSTEM issued to D. E. Whitney on Aug. 27, 1985.

U.S. Pat. No. 4,527,327 entitled DEVICE FOR TRANSFERRING AN ELECTRIC OR ELECTRONIC COMPONENT TO A MOUNTING BOARD issued to F. H. Van Dueren on Jul. 9, 1985.

U.S. Pat. No. 5,201,696 entitled APPARATUS FOR REPLACEMENT OF VACUUM NOZZLES issued to J. A. Kinback et al. on Apr. 13, 1993.

U.S. Pat. No. 5,105,528 entitled METHOD AND APPARATUS FOR SUPPLYING AND CHANGING TIPS OF A PICK AND PLACE SPINDLE issued to H. J. Soth et al. on Apr. 21, 1992.

The disclosures of these cross-references are incorporated, by reference thereto, into the instant application.

BACKGROUND OF THE INVENTION

Heretofore component placement machines utilizing a vacuum nozzle for picking and placing components were limited to components having a flat planar top surface. This type of surface is necessary to effect a vacuum seal between the nozzle tip and the top surface of the component whereby the applied vacuum would lift and maintain a firm connection between the nozzle tip and component for picking and placing. However, there are many components whose top surface is not flat or planar and thus can not be included in the selection of components for automated assembly by a pick and place machine utilizing prior art replaceable nozzle tips.

BRIEF SUMMARY OF THE INVENTION

A replaceable nozzle tip for the vacuum spindle of a pick and place machine is provided with mechanical fingers for gripping a component. A piston is displaceable within a housing of the replaceable nozzle tip according to vacuum being applied to the bore of the spindle, as would be used for conventional component pick and place, and a rod of the piston extends between lever arm portions of the fingers. Vacuum applied to the spindle pulls the piston and causes an enlargement of the rod to engage and pivot the fingers about hinge portions of the fingers in order to close the fingers onto the component. Opening of the fingers is accomplished, upon discontinuing the vacuum, by the spring force stored in the hinge portions and/or by applying positive air pressure to the spindle to provide a push to the piston.

DESCRIPTION OF THE PREFERRED EMBODIMENT

Figure 1:
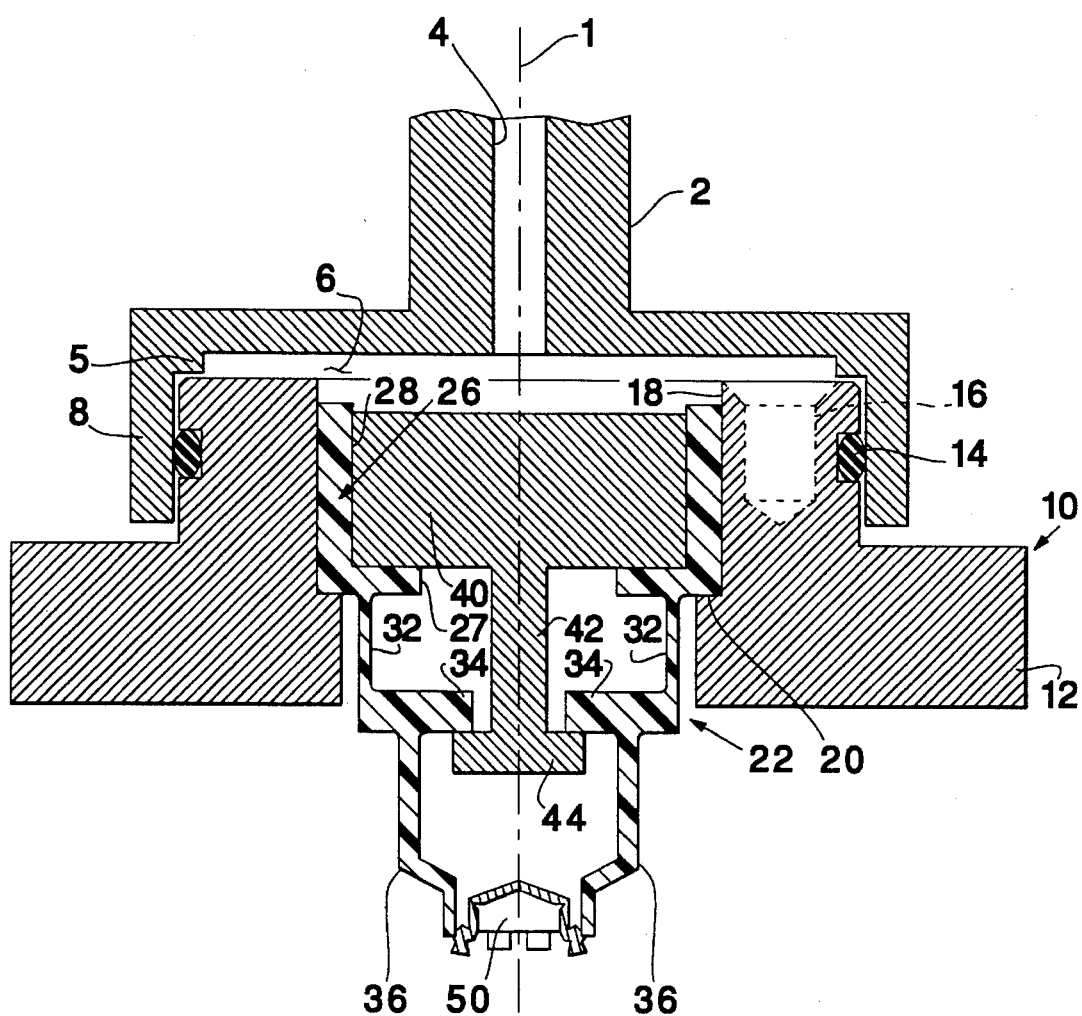
FIG. 1 is a cross-sectional view of a replaceable nozzle tip mounted on the spindle of a component pick and place machine and depicting the finger assembly with the fingers in a relaxed, open condition just prior to gripping the component.

Referring to FIG. 1, a vacuum spindle 2 of a machine used to pick and place components, such as electrical component 50, has a central bore 4. An enlarged connection end of spindle 2 has an annular lip 8 defining a recess which is stepped at 5 so as to define a plenum 6. Body 12 of replaceable nozzle tip 10 has a reduced diameter portion with an outer surface, which is sized to fit within the recess defined by annular lip 8 of spindle 2, and an annular groove within which O-ring 14 is retained. O-ring 14 serves the dual purposes of providing (i) a fluid seal between the spindle's annular lip 8 and the replaceable nozzle tip 10, and (ii) sufficient friction to maintain a connection therebetween when no vacuum is applied through spindle bore 4.

Body 12 also has a cylindrical bore 18, stepped at 20, for receiving unitary finger assembly 22. An upper, tubular portion 26 of the finger assembly 22 is affixed within bore 18 of body 12 by adhesive or mechanical interference fit and provides a cylinder within which a piston 40 is slidingly received for reciprocation. Piston 40 has an integral piston rod 42 extending through a bottom wall 27 of tubular portion 26 and terminating in an enlargement 44. Depending from bottom wall 27 are hinge portions 32 which have an inwardly directed lever arm 34 from which, in turn, finger portion 36 depends.

Hinge portion 32 connecting lever arm 34 to bottom wall 27 pivots when the lever arm 34 is engaged by upward movement of enlargement 44 upon actuation of piston 40 via the application of vacuum within plenum 6 causing fingers 36 to grip component 50. The material of hinge portion 32 is sufficiently "springy" that, upon sufficient reduction of spindle vacuum, the lever arms 34 of fingers 36 will pull piston 40 downwardly while opening the fingers 36 thereby ungripping component 50. Alternatively, it is contemplated that the engagement of enlargement 44 between piston rod 42 and lever arms 34 could be such that the lever arms 34 would be "driven" down, as well as up, by the piston when a positive air pressure replaces the vacuum in spindle bore 4 causing piston 40 to move in a downward direction.

The material selected, as well as the structure of the portions of fingers 36 which depend below lever arms 34, can be soft and/or flexible enough so as to minimize damage to the components 50 being handled during closing of the fingers 36 thereon.

Interchangeability of the nozzle tip to the spindle is similar to that provided in U.S. Pat. No. 5,201,696. As in this particular prior art, the friction provided by O-ring 14 is sufficient to maintain a connection between the spindle 2 and replaceable nozzle tip 10 without vacuum being applied through spindle 2 (e.g., during repositioning of the spindle 2 to another site at which a component 50 is to be picked up or to a site at which nozzle tip 10 is to be replaced).

However, unlike this particular prior art, the body of component 50 is not required to sealingly close a vacuum bore of the replaceable tip in order to hold the component and effect a "rigid" connection between tip 10 and spindle 2. Rather, the instant invention effects and maintains the so-called rigid connection described in the above patent whenever vacuum is applied to spindle 2 by acting upon piston 40 which, in turn, closes fingers 36 to grip component 50.

In use, the vacuum drawn through bore 4 will evacuate the plenum 6 of the spindle 2 and retract piston 40 so as to actuate closing of the gripping fingers 36. The upward travel of piston 40 is restricted so as to not block bore 4 of spindle 2. Lever arms 34 will pivot so as to abut piston rod 42 or component 50 will limit the closing of fingers 36 so as to limit the upward stroke of piston 40. Vacuum in plenum 6 is then sufficient to provide a "rigid" connection of the replaceable nozzle tip 10 to the spindle 2.

The gripping fingers 36 can also serve to center the component 50 on the spindle's longitudinal axis 1 during gripping thereof. As seen from FIG. 3, the component engaging finger tips 36 may be angled to cooperate with the profile of the component 50 so that, while closing thereon, the two fingers 36 can center the component on axis 1 while also squaring the component, e.g., by slightly rotating and reorienting it about axis 1.

Figure 2:
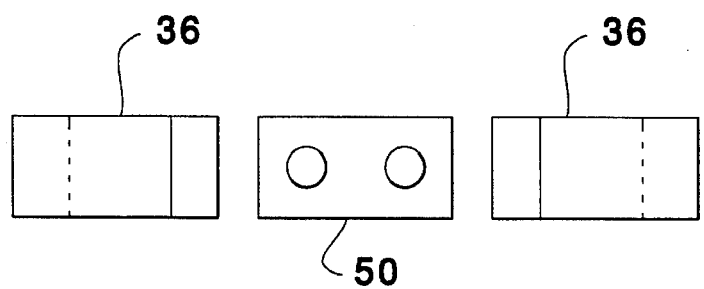
FIG. 2 is a bottom plan view of FIG. 1, in which the vacuum spindle and the body of the replaceable nozzle tip have been removed so as to illustrate only the component and one pair of fingers for gripping.
Figure 3:
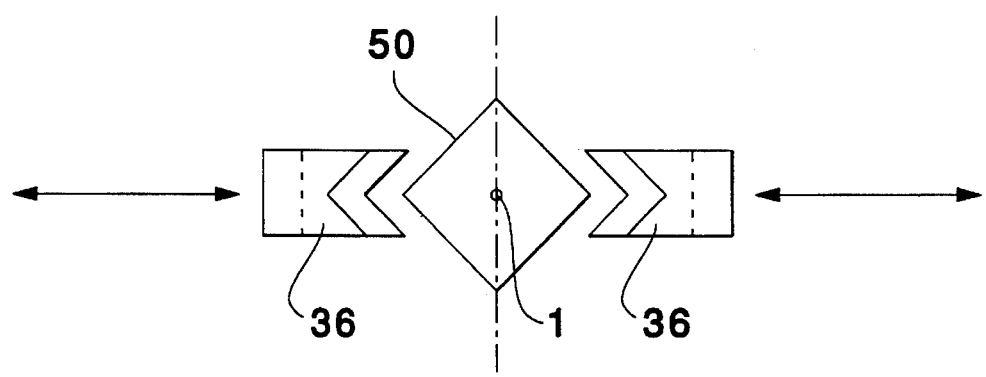
FIG. 3 is a partial bottom plan view depicting an alternate structure of the finger tips which provides for gripping and centering about three axes by use of only one pair of opposed fingers.
Figure 4:
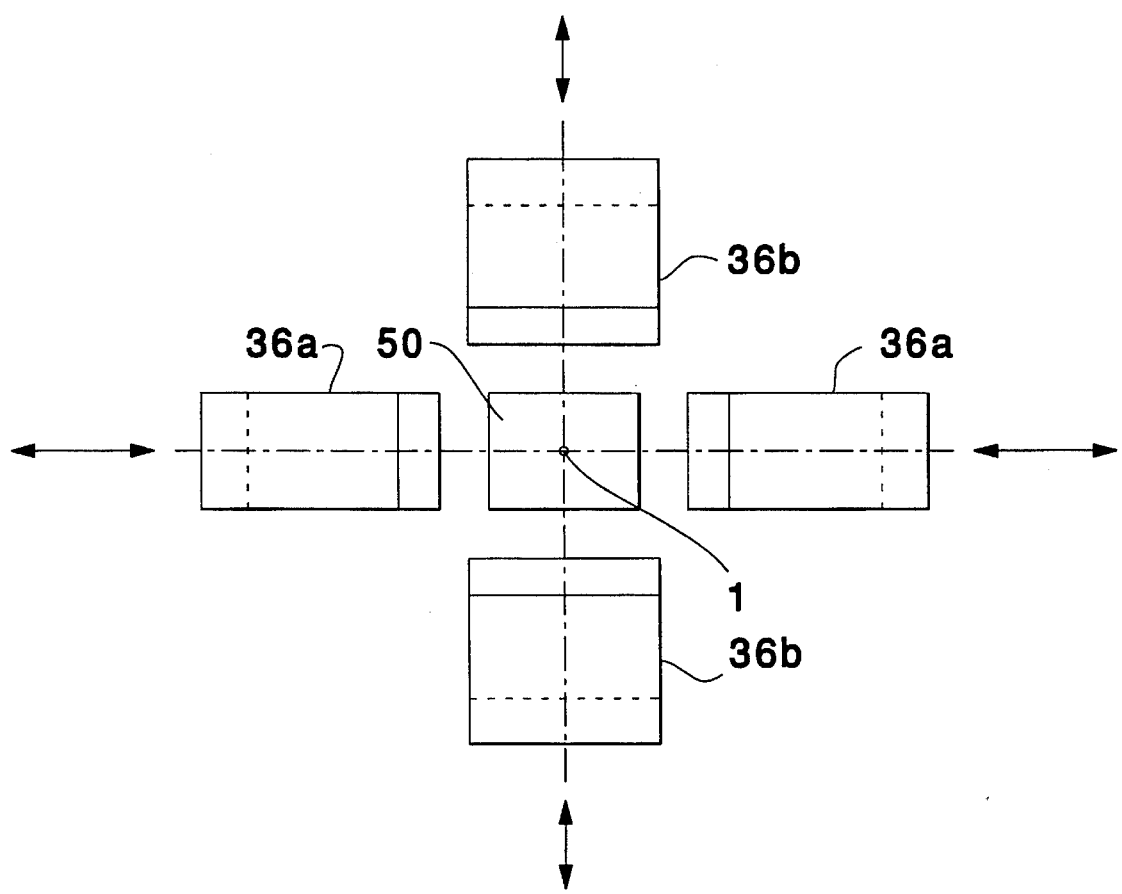
FIG. 4 is a view similar to that of FIG. 3, but depicting two pairs of fingers for gripping and centering.

Although only two fingers 36 are illustrated in FIGS. 1, 2, and 3, it is sometimes preferable to provide three or more such fingers 36. For example, FIG. 4 depicts the case of four fingers in which one opposed pair of fingers 36a may be caused to engage and close on a component 50 along with another opposed pair of fingers 36b engaging and closing on the component 50. Such engagement with the component serves to center and square it about axis 1. As can be appreciated by referring to FIG. 4, with the component sides being unequal in length and the pairs of opposed finger tips being spaced apart in proportion to the component sides, simultaneous and same rate closing of the finger tips towards the component will result in fingers 36a and fingers 36b centering and squaring the component about axis 1 simultaneously.

Thus, it will be seen that the objects set forth above, among those made apparent from the preceding description, are efficiently attained and since certain changes may be made in the construction set forth without departing from the scope of the invention, it is intended that all matter contained in the above description or shown in the accompanying drawings shall be interpreted as illustrative and not in a limiting sense.

For example, although the above-described unitary construction of the finger assembly, other than piston 40, is preferred, it is contemplated that the hinge portion of the fingers could be provided by separate component parts pinned or otherwise hinged together.

Also, as indicated in phantom in FIG. 1, the body of the replaceable tip may be provided with a recess for receiving a corresponding pin (not shown) of the spindle in order to locate the orientation of the replaceable nozzle tip about the longitudinal axis 1 and the replaceable nozzle may be retained on the spindle by mechanical locking rather than vacuum.

It is to be understood also that the following claims are intended to cover all of the generic and specific features of the invention herein described, and all statements of the scope of the invention which, as a matter of language, might be said to fall therebetween.

We claim:

1. A component handling machine for mechanically picking up components, said component handling machine comprising:

a vacuum spindle, said vacuum spindle including a vacuum bore and a first annular sealing surface;

a nozzle tip removably attached to the vacuum spindle and capable of automated replacement with respect thereto, said replaceable nozzle tip including a gripping assembly and a body having a second annular sealing surface;

means for creating an air tight seal between the first and second annular sealing surfaces and for maintaining a connection between the replaceable nozzle tip and the vacuum spindle in the absence of a vacuum applied to the vacuum bore;

said gripping assembly including a plurality of gripping fingers and a piston member, said gripping fingers having respective distal end portions and being capable of closing and opening in order, respectively, to effect the mechanical gripping and releasing of components by moving said gripping fingers relative to each other, said piston member being movable with respect to said body of said replaceable nozzle tip body in response to the application of a vacuum to said vacuum bore, said piston member capable of engaging and displacing each said gripping finger during said movement of said piston member relative to said body of said replaceable nozzle tip, said piston member including at least one surface in fluid communication with said vacuum bore;

whereby, upon the application of a vacuum to said bore, (i) said vacuum acts upon said surface of the piston member to move the piston member with respect to said body of said replaceable nozzle tip, (ii) said piston member engages and displaces each said gripping finger, and (iii) said gripping fingers move relative to each other to mechanically grip a component between said distal end portions of said gripping fingers.

2. The component handling machine of claim 1, wherein said gripping assembly includes a unitary element which includes said plurality of gripping fingers.

3. The component handling machine of claim 2, wherein each of said gripping fingers further includes an integral hinging portion permitting said relative movement with respect to each other.

4. The component handling machine of claim 3, wherein each said hinging portion storing a spring force therein upon said movement by said piston member, said spring force at least partially effecting a return movement of said piston member upon the applied vacuum being removed.

5. The component handling machine of claim 2, wherein said plurality of gripping fingers includes at least three gripping fingers.

6. The component handling machine of claim 1, wherein the distal end portions of said gripping fingers include angled tips for centering and squaring a component to be lifted.

7. The component handling machine of claim 1, wherein one of said replaceable nozzle tip body and said vacuum spindle includes a stepped abutment surface to define a plenum between said vacuum bore and said piston member surface.

8. The component handling machine of claim 1, wherein said means for creating an air tight seal and for maintaining a connection between the replaceable nozzle tip and the vacuum spindle includes a compressible unitary sealing and retention element.

9. The component handling machine of claim 8, wherein the attachment between said replaceable nozzle tip and said vacuum spindle is created by relative linear movement between said vacuum spindle and the replaceable nozzle tip, and by a frictional holding force imparted by said compressible unitary sealing and retention element.

\* \* \* \* \*